July 27, 1926.  G. STEINMETZ  1,594,279
CARRYING FRAME FOR WALL BRACKETS, SUSPENSION HOOKS, AND THE LIKE
Filed May 8, 1926

Inventor
G. Steinmetz
by
Langner Parry Card & Langner
Attys

Patented July 27, 1926.

1,594,279

UNITED STATES PATENT OFFICE.

GEORG STEINMETZ, OF BERLIN, GERMANY.

CARRYING FRAME FOR WALL BRACKETS, SUSPENSION HOOKS, AND THE LIKE.

Application filed May 8, 1926, Serial No. 107,708, and in Germany January 28, 1925.

This invention has reference to a carrier which may be used as a support for wall brackets, shelves, suspension hooks of any kind, hangers. and the like, and has for its main object the removal of the disadvantages which are present in the hitherto known carriers or supports and to provide a carrier or frame which shall be simple in construction, efficient in use and capable of withstanding relatively very heavy loads.

The invention also provides for an arrangement of the said kind which shall be of the utmost strength and rigidity, and in which nevertheless the suspension arm or frame proper will be subjected to only very small forces in comparison with the load which it is able to support.

The invention still further provides for a particularly convenient and efficient manner of suspension, and for facility in handling and transporting the device when not in use.

In its essential features the invention comprises an angular supporting frame of flat material arranged edgeways, and having a suspension ring or the like arranged at its upper end by means of which it may be attached to a hook or the like in a wall. Hinged to the free ends of the angular frame is a substantially U-shaped frame which is adapted to take a horizontal position when in use, while it may be collapsed when not in use. The arrangement is such that the said frame, in its working position, is held in position by abutting against the lower end of the angular frame.

The new carrier offers very considerable advantages over the known types of carriers serving the same purpose. The angular support as well as the carrier frame have their members arranged edgeways, so that the carrier will stand very considerable loads in spite of comparatively small dimensions. A further advantage consists in the above described particular arrangement whereby the usual ties for holding the frame in its working position are rendered unnecessary and are consequently omitted. A particular mechanical advantage further consists in the reduction of the leverage acting on the suspension hook in the wall, on which the entire device is suspended by means of a hook or ring. This particular way of suspension in combination with the angular construction of the device results in a favorable action since, as the load which is supported upon the frame no longer acts in a direction at right angles to the suspension hook, but acts mainly perpendicular to the wall against which the angular device is adapted to bear. This force thus acts in a direction substantially parallel to the suspension hook and therefore exerts only a very small strain on the latter in a right angle direction.

The accompanying drawing illustrates the invention by way of example.

Figure 1:
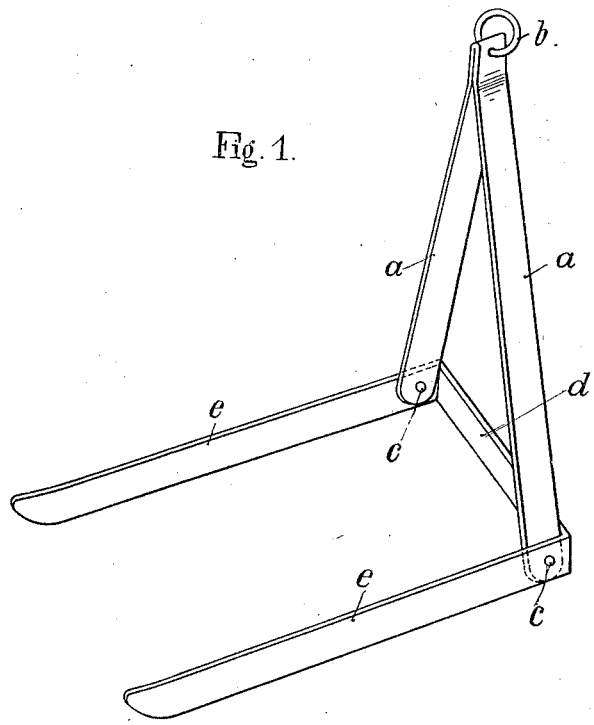
Fig. 1 is a perspective view of the device in position ready for use.

As shown in these figures the carrier includes an angular suspension frame $a$ having at its apex a ring $b$ by means of which the entire device may be hung on a suspension hook, nail or the like in the wall. To the free ends of the legs of the said angular member is attached a substantially U-shaped frame as by means of hinge pins $c$, said frame comprising a transverse member or strip $d$ and two carrying arms $e$. In their extended position which is shown in Fig. 1 these two arms serve to support a shelf, a wall bracket upon which any desired articles may be placed, or vertical files, drawings or the like may be suspended therefrom, for which purpose the said frame is particularly adapted.

The arrangement of the U-shaped frame $d$, $e$ relative to the angular carrier $a$ is such that in its working position the frame $d$, $e$ bears with the inner face of the flat strip $d$ against the outer edges of the flat members $a$, which thus form abutments of large area for the frame so as to hold the same in its horizontal position. It is preferable to use flat iron or other flat material arranged edgeways for both frames $a$ and $d$, $e$ and to form the frames of single pieces of bent material.

Figure 2:
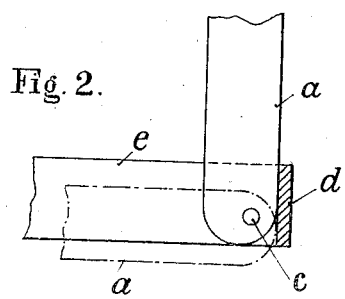
Fig. 2 illustrates a detail on an enlarged scale.

Fig. 2 illustrates the way the strip $d$ abuts against the straps $a$; the broken lines showing the latter in collapsed inoperative position.

What I claim is:—

A carrier, comprising, an inverted V-shaped supporting frame, a U-shaped carrier frame, the frames each comprising a single piece of bent flat material, pivots connecting the ends of the legs of the V frame to the legs of the U frame directly adjacent the base of the U frame and positioned with edges of the V frame bearing against a relatively broad plane face of the base of the U frame when the carrier is in operative position.

In testimony whereof I affix my signature.

GEORG STEINMETZ.